United States Patent
Birnbaum et al.

(10) Patent No.: US 9,529,997 B2
(45) Date of Patent: Dec. 27, 2016

(54) CENTRALIZED PLATFORM SETTINGS MANAGEMENT FOR VIRTUALIZED AND MULTI OS SYSTEMS

(71) Applicant: Intel IP Corporation, Santa Clara, CA (US)

(72) Inventors: David Birnbaum, Modiin (IL); Abdul M. Bailey, Tigard, OR (US); Izoslav Tchigevsky, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 89 days.

(21) Appl. No.: 14/491,525

(22) Filed: Sep. 19, 2014

(65) Prior Publication Data

US 2016/0085963 A1 Mar. 24, 2016

(51) Int. Cl.
*G06F 21/53* (2013.01)
*G06F 9/455* (2006.01)

(52) U.S. Cl.
CPC ........... *G06F 21/53* (2013.01); *G06F 9/45558* (2013.01); *G06F 2009/45587* (2013.01)

(58) Field of Classification Search
USPC ................. 726/2, 23, 30; 713/150, 153, 164
See application file for complete search history.

(56) References Cited

U.S. PATENT DOCUMENTS

| | | | | |
|---|---|---|---|---|
| 6,587,882 B1* | 7/2003 | Inoue | .................. | H04L 61/2015 370/331 |
| 8,079,030 B1* | 12/2011 | Satish | .................... | H04L 63/14 713/164 |
| 8,261,320 B1* | 9/2012 | Serenyi | ............... | G06F 17/3089 711/163 |
| 8,910,238 B2* | 12/2014 | Lukacs | .................... | G06F 21/53 713/164 |
| 2009/0055641 A1* | 2/2009 | Smith | ..................... | G06F 21/57 713/100 |
| 2009/0307689 A1* | 12/2009 | Sudhakar | ............ | G06F 9/45558 718/1 |
| 2010/0146267 A1* | 6/2010 | Konetski | ................. | G06F 21/53 713/164 |
| 2012/0173871 A1* | 7/2012 | Ashok | ................... | G06F 21/575 713/153 |
| 2013/0024855 A1* | 1/2013 | North | ................... | G06F 11/1484 718/1 |
| 2014/0173709 A1* | 6/2014 | Eldar | .................... | H04L 9/3226 726/7 |
| 2014/0208088 A1* | 7/2014 | Somani | ............... | G06F 9/44505 713/1 |
| 2014/0245295 A1* | 8/2014 | Tsirkin | ................ | G06F 9/45533 718/1 |

(Continued)

*Primary Examiner* — Sayed Beheshti Shirazi
(74) *Attorney, Agent, or Firm* — Lowenstein Sandler LLP

(57) ABSTRACT

A processing device may include a first processor executing an operating system including a configurable setting and an isolated execution environment including a second processor communicatively coupled to the first processor, and a secure store coupled to the second processor to store a setting profile containing a copy of the configurable setting, in which the second processor is to, subsequent to establishing a trust relationship between the isolated execution environment and the operating system, synchronize the configurable setting with the setting profile.

16 Claims, 12 Drawing Sheets

(56) References Cited

U.S. PATENT DOCUMENTS

| | | | | |
|---|---|---|---|---|
| 2014/0268555 A1* | 9/2014 | Kurczewski | .......... | G06F 1/1681 |
| | | | | 361/679.55 |
| 2014/0279909 A1* | 9/2014 | Sudarsanam | ..... | G06F 17/30088 |
| | | | | 707/639 |
| 2014/0310810 A1* | 10/2014 | Brueckner | .......... | H04L 63/1441 |
| | | | | 726/23 |
| 2015/0293172 A1* | 10/2015 | Bhargava | ......... | G01R 31/31705 |
| | | | | 714/727 |
| 2015/0373331 A1* | 12/2015 | Krutsch | ............... | H04N 19/136 |
| | | | | 382/243 |
| 2016/0036826 A1* | 2/2016 | Pogorelik | ............. | H04L 63/105 |
| | | | | 726/1 |
| 2016/0085963 A1* | 3/2016 | Birnbaum | ............... | G06F 21/53 |
| | | | | 726/30 |

* cited by examiner

CENTRALIZED PLATFORM SETTINGS MANAGEMENT FOR VIRTUALIZED AND MULTI OS SYSTEMS

TECHNICAL FIELD

The embodiments of the disclosure relate generally to processing devices and, more specifically, relate to a centralized platform to manage settings for virtualized systems and systems running multi operating systems.

BACKGROUND

Computing devices (e.g., desktop/mobile computers, tablet computers, smart phones) move towards supporting virtualized operating systems (OS) and/or dual (or multi) boot OS modes where multiple operating systems may run on a same computing device. For example, a computing device may be booted to run under Window™ or Linux™. For such computing devices, each of the supported operating systems may include settings that need to be configured with certain parameters in order to run hardware and/or software resources including network interface, security, and file directories etc. The configurable settings of the operating systems may include Wireless Local Area Network (WLAN) profiles, Wireless Wide Area Network (WWAN) settings, network access certificates, and active directory. An administrator may set all of these configuration settings for each of the operating systems that are supported by the computing device.

However, to manually enter a same setting multiple times is a tedious task for the administrator and may create security issues if there are errors during the data entry.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
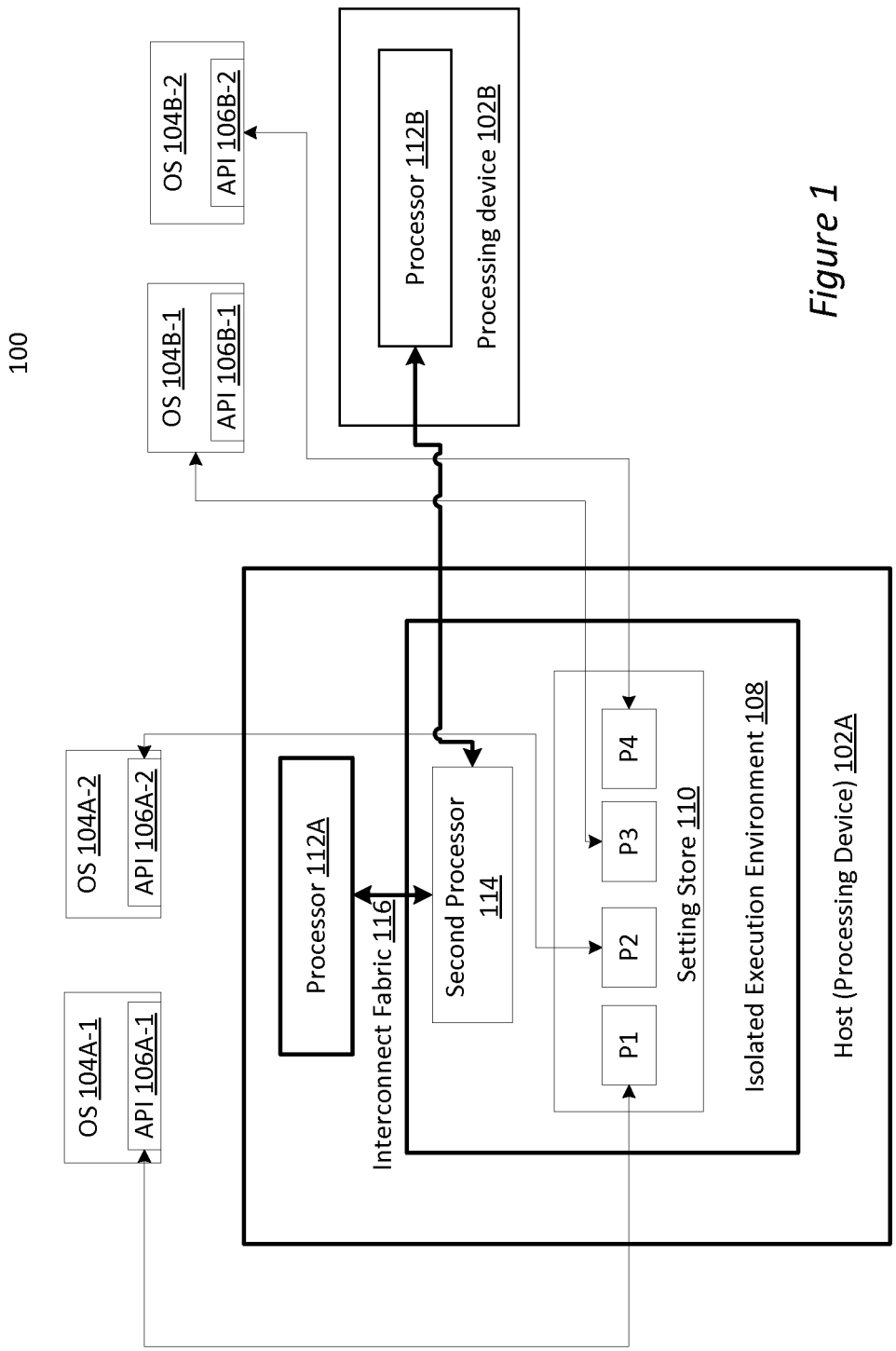
FIG. 1 illustrates a processing device including a centralized setting manager to manage settings of hosted operating systems according to an embodiment of the present disclosure.

Embodiments of the present disclosure may include a centralized platform manager (e.g., in the form of an isolated execution environment) to store one or more setting profiles for operating systems that are hosted on a host device. Each setting profile may include parameters for settings of one or more operating systems executing on the host device. An isolated execution environment is an execution environment that executes code independently and securely in isolation from the rest of applications running on the host device so that operating systems and/or basic input/output system (BIOS) executing on the host device are unaware of the presence of the isolated execution environment. In one embodiment, an execution environment may include a secondary processor coupled to a temper-resistant hardware module residing in a secured storage. The secondary processor may be coupled to a processing device (such as a processing core) that executes one or more operating systems. The isolated execution environment is to store, process, and protect sensitive data.

In one embodiment, the isolated execution environment may include an offload engine (i.e., an execution engine that does not carry the load of computation) that may establish a trusted relationship with each of the operating systems of the host device. A trust relationship is a relationship that when established, would allow parameter synchronization between two platforms without further verification of the right to access. Thus, embodiments may allow the administrator to perform a one-time process to establish the trusted relationship between an operating system and the isolated execution environment, and thereafter, the isolated execution environment may seamlessly synchronize the settings of the operating system with setting profiles stored in a setting store in the isolated execution environment so that the operating system may access to these settings. In one embodiment, the isolated execution environment may establish the trust relationship with multiple operating systems so that the settings of each of the operating systems may be synchronized with a setting profile stored in a setting store of the isolated execution environment.

In one embodiment, the host device may support the execution of multiple operating systems. For example, the host device may, through a virtual machine manager (hypervisor), support multiple virtual machines each of which may execute an operating system. In one embodiment, the operating system of one of the virtual machines may be designated as the isolated execution environment. The designated operating system therefore may manage trust relationship with the rest of operating systems in a central location and manage the read/write access to these setting profiles by the rest of the operating systems.

In this way, embodiments of the present disclosure may allow users of the host device to have seamless credentials sharing among all operating systems executing on the host device. For example, a user of the host device may be associated with a sharing WiFi profile among different operating systems. Once the network preference of the user is configured with respect to one operating system, the need to enter the user's credentials for other operating systems may be saved.

FIG. 1 illustrates a processing system 100 that may include a centralized setting manager to manage setting of hosted operating systems according to an embodiment of the present disclosure. Referring to FIG. 1, the processing system 100 may include one or more processing devices (or hosts) 102A through 102B that may each include a respective processor 112A-112B for executing one or more operating systems 104A-1, 104A-2, 104B-1, 104B-2. In one embodiment, the processing device 102A may be a system-on-a-chip (SoC). In one embodiment, the processor 112A of the processing device 102A may execute one or more operating systems 104A-1 through 104A-2 (on host 102A), and processing device 102B may execute the operating systems 104B-1 through 104B-2 (on host 102B). In one embodiment, processing devices 102A-102B may support dual or multi operating systems in the sense that the host device may be booted to one of the supported operating systems and be able to subsequently switch to another operating system. In another embodiment, a processing device may host one or more virtual machines (not shown) where each of the virtual machines may execute one of the operating systems.

In one embodiment, the processing device 102A may further include a isolated execution environment 108 which may include a second processor 114 (which is referred to as a secondary processor 114 hereinafter) and a secure store 110 coupled to the secondary processor 114. The secondary processor 114 may be coupled to the processors 112A, 112B via an interconnect fabric 116. In one embodiment, the interconnect fabric 116 may include a bus and a network card (not shown) for transmitting instructions and data between processing devices 102A, 102B and the isolated execution environment 108.

In one embodiment, each of the operating systems 104A-1 through 104A-2, 104B-1 through 104B-2 may include a respective application programming interface (API) (also referred to as an agent) 106A-1 through 106A-2, 106B-1, through 106B-2 which operating systems 104A-1 through 104A-2, 104B-1 through 104B-2 may communicate via a network card (according to a network stack or protocol) with an isolated execution environment 108 to receive setting parameters from setting profiles P1 through P4 stored in a setting store associated with the isolated execution environment 108. Further, any update to the setting of the operating systems 104A-1 through 104A-2, 104B-1 through 104B-2 may, through agents 106A-1 through 106A-2, 106B-1, be transmitted and written to the setting profiles P1 through P4 stored in the setting store 110 of the isolated execution environment 108.

In one embodiment, an offload engine may be used as the isolated execution environment 108. The offload engine may include dedicated hardware (such as the secondary processor 114), software (an execution environment implemented on the processing core), and firmware to perform specific tasks in place of the processors contained in the processing devices 102A, 102B. The offload engine may take processing loads off the processors 112A, 112B. In one exemplary embodiment, the offload engine may include a manageability (or management) engine (ME) which may be a firmware dedicated to manage tasks on behalf of the processor 102A.

The manageability engine may be coupled to the processor 102A via the interconnect 116 or via a network stack to the processor 112B. In another embodiment, the offload engine may include a centralized security engine (CSE) that may, in addition to manage security for the processing device 102A, include a secure setting store 110 to store setting profiles (e.g., P1 through P4) for operating systems 104A-1 through 104A-2, 104B-1 through 104B-2. In one embodiment, when the host devices host one or more virtual machines, the virtual machine manager (or the hypervisor) may be designated and configured as the isolated execution environment.

In one embodiment, the isolated execution environment 108 may first establish a trust relationship with operating systems 104A-1 through 104A-2, 104B-1 through 104B-2. The trust relationship between operating systems 104A-1 through 104A-2, 104B-1 through 104B-2 and the isolated execution environment 108 may be established using various suitable methods described in conjunction with FIG. 2.

In one embodiment, subsequent to establishing the trust relationship with the operating system, the secondary processor 114 of the isolated execution environment 108 may push the setting parameters stored in a setting profile to the operating system and pull updates to the settings from the operating system and save the updates to settings at the corresponding setting profile in the setting store 110 of the isolated execution environment 108. For example, a registered application with OS 104A-1 may receive any update to settings of OA 104A-1 by pushing updates to setting profile P1 stored in the setting store 110 from the isolated execution environment 108, or may write any update to settings of OA 104A-1 by pulling from the setting store 110. In this way, the registered application may be synched with the settings stored in the setting store 110 seamlessly without otherwise disturbing the operation of operating systems 104A-1 through 104A-2, 104B-1 through 104B-2.

In one embodiment, each of the operating systems 104A-1 through 104A-2, 104B-1 through 104B-2 may have a respective corresponding setting profile P1 through P4. Each of the setting profiles P1 through P4 may include setting parameters for one or more operating systems. For example, a setting profile may include setting parameters for hardware and software resources such as WLAN, WWAN, security certificate, and active directories. Some of sources may further include dependent settings. For example, the setting parameters for WLAN may further include dependent setting parameters of static IP, proxy, and device certificates. These dependent settings may be identified as related to the WLAN setting profile. Thus, the update to one of the setting profiles P1 through P4 may be pushed to a corresponding one of operating systems 104A-1 through 104A-2, 104B-1 through 104B-2. In another embodiment, one or more operating systems may be associated with a single setting profile so that the one or more operating systems may share the setting profile. Thus, any update to the shared setting profile may be pushed to the one or more operating systems.

Figure 2:
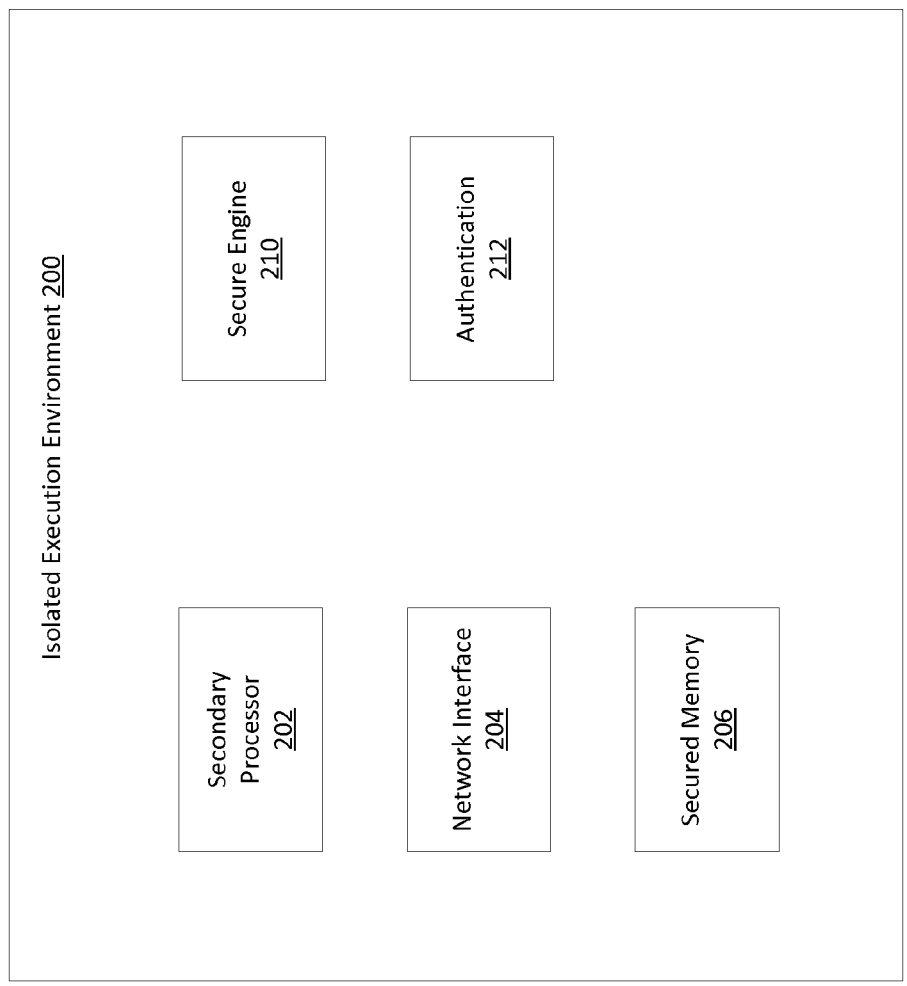
FIG. 2 illustrates an isolated execution environment according to an embodiment of the present disclosure.

The isolated execution environment 108 may include hardware components on which software modules may be implemented to perform functions to achieve seamless and secured storage of settings for operating systems. FIG. 2 illustrates an isolated execution environment 200 according to an embodiment of the present disclosure. The isolated execution environment 200 may include a hardware environment including a processor 202 (such as a secondary processor), a secured network interface 204 for communicating with external processors, and a secured memory 206 accessible only by the processor 202. The processor 202 may be a processing core that may be configured to execution instructions stored in memory 206. The secured memory 206 may be a suitable temper-resistant storage device that may include the setting store 110 which includes setting profiles P1 through P4 stored thereon.

In one embodiment, network interface 204 may include a network card that is configured to provide communication channels between the isolated execution environment 200 and the operating systems whose setting profiles are stored in the setting store in the secured memory 206. The communication between the isolated execution environment 200 and the operating systems (such as 104A-1 through 104A-2, 104B-1 through 104B-2 as shown in FIG. 1) may be based on certain communication protocols. In this way, processor 202 may push setting profiles from the setting store to the operating systems and pull setting from the operating systems to the setting store via network interface 204.

In one embodiment, as part of establishing a trust between the operating system and the isolated execution environment 200, the isolated execution environment 200 may include an authentication module 212 which may be implemented as instructions executed on processor 202. The processor 202 may execute the authentication module 212 to establish an authenticated session between an operating system and the isolated execution environment 200. For example, the authentication module 212 may receive data of authentication information from the operating system. The authentication information may include but not limited to security codes or combination of an identification of the operating system and a passcode. If the authentication information matches data stored in the isolated execution environment 200, an authenticated session may be established, through which the operating system and the isolated execution environment 200 may securely communicate. The authentication may establish secured communication channels (or trust) between the processors 112A, 112B with the secondary processor 114 thus with the isolated execution environment 108.

In another embodiment, the isolated execution environment 108 may establish the trust relationship with an operating system by issuing a security certificate to be associated with the root of the operating system. The operating system having the security certificate issued by the isolated execution environment is deemed to have established a trust relationship with the isolated execution environment. Each application executed on the operating system may register with the isolated execution environment (e.g., centralized security engine) to establish the trust relation.

In one embodiment, the isolated execution environment 200 may include a security engine 210 with which applications controlled by the operating system may register. For example, software applications including system applications (such as the operating system) and user applications that need to synchronize and receive setting parameters from a setting profile stored in the setting store may register with the security engine 210 of the isolated execution environment 200 and along with the authentication session to establish a trust relationship with the isolated execution environment 200. Subsequent to the registration with the security engine, the software application may receive new setting parameters pushed by the processor 202 through network interface 204.

In one embodiment, each of the operating systems 104A-1 through 104A-2, 104B-1 through 104B-2 as shown in FIG. 1 may include an API (or agent) 106A-1 through 106A2, 106B-1 through 106B-2 that are capable of pushing and pulling setting parameters to and from setting profiles P1-P4 stored in secured setting store 110 of an isolated execution environment 108. Each of the operating systems may establish a trust relationship with the isolated execution environment 108 by setting a root in the isolated execution environment. Once the trust relationship is established, an application registered with the isolated execution environment may, via the agent associated with the operating system, push setting parameters to or pull setting parameters from a corresponding setting profile stored in the setting data store 110.

Figure 3:
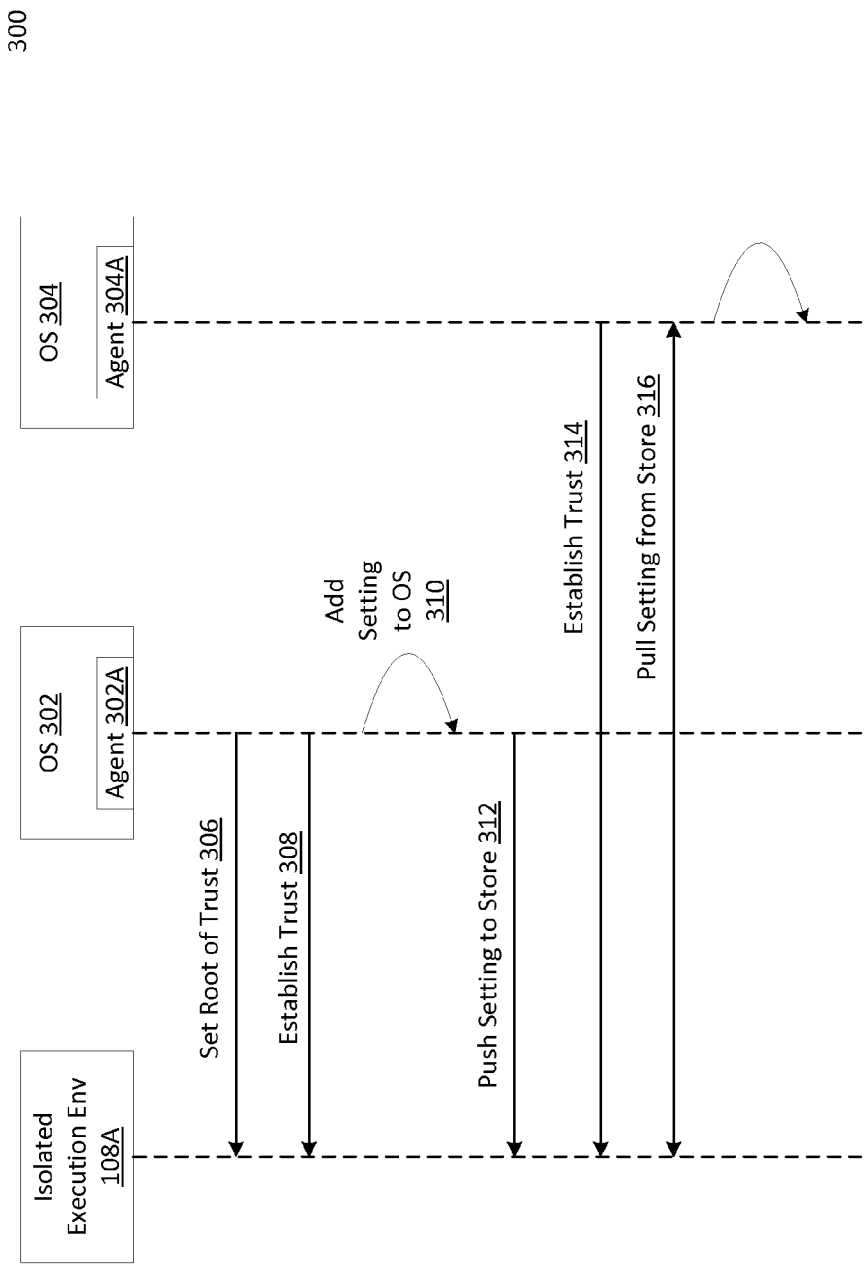
FIG. 3 is a cross-functional diagram that illustrates the interactions between an isolated execution environment and two operating systems according to an embodiment of the present disclosure.

FIG. 3 is a cross-functional diagram 300 that illustrates the interaction between an isolated execution environment and two operating systems according to an embodiment of the present disclosure. As shown in FIG. 3, an isolated execution environment 108 may include a secured storage synchronized with configurable settings of operating systems 302, 304 each having a respective agent 302A, 302B. At 306, a secondary processor of the isolated execution environment may establish a trust relationship with the operating system 302. For example, agent 302A may transmit a root certificate to the isolated execution environment 108. At 308, the isolated execution environment may verify the root certificate and if valid, establish a trust relationship between the isolated execution environment 108 and operating system 302. Any application under the control of operating system 302 may also register with the isolated execution environment 108.

Subsequently, at 310, a setting of the operating system 302 may be updated by a user or an administrator. In response to the update of settings of the operating system 302, agent 302A may push the updated setting to the isolated execution environment 108 to store in a corresponding setting profile.

At 314, the operating system 304 may also establish a trust relationship with the isolated execution environment. Subsequently, at 316, agent 304A associated with operating system 304 may pull the setting parameters from the corresponding setting profile that was updated. The agent 304A may store the pulled setting parameters in an internal register of the operating system 304 and thus update its setting.

Figure 4:
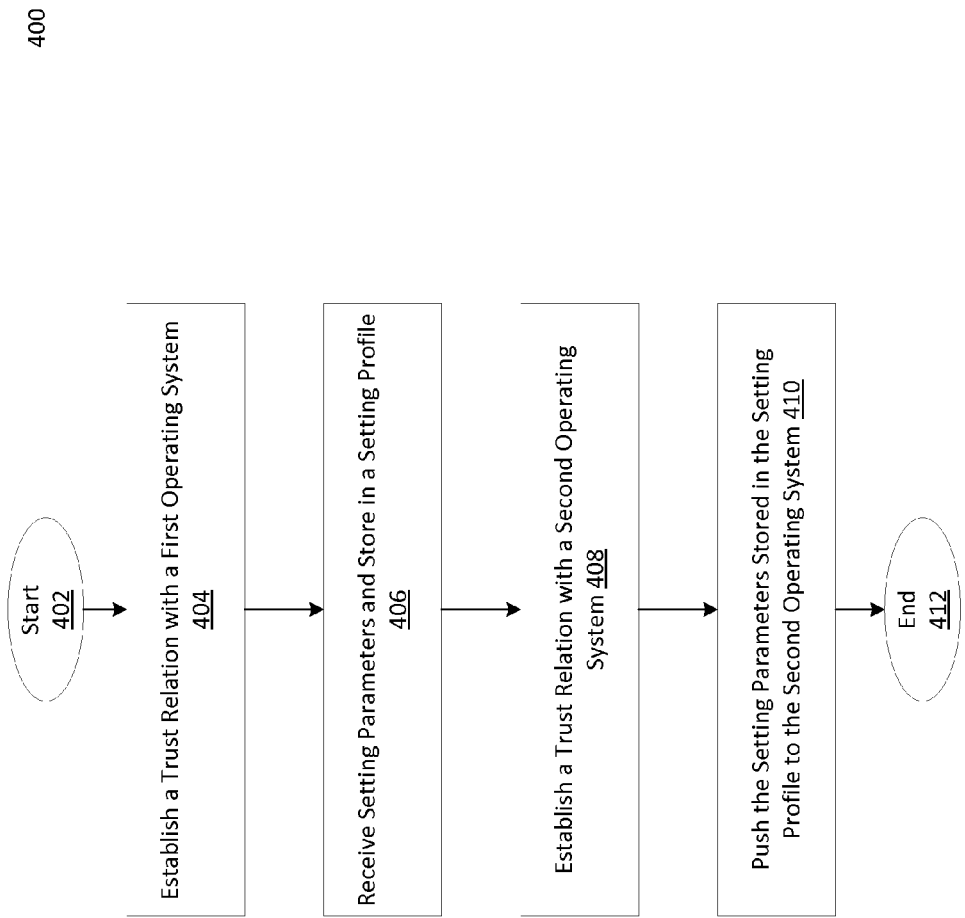
FIG. 4 is a block diagram of a method to push setting parameters from a first operating system to a second operating system using an isolated execution environment according to an embodiment of the present disclosure.

FIG. 4 is a block diagram of a method 400 to push setting parameters from a first operating system to a second operating system using an isolated execution environment according to an embodiment of the present disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logics of the isolated execution environment 108 as shown in FIGS. 1 and 2.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, at 402, the operations start. At 404, a processor (i.e., a secondary processor such as a manageability engine or a centralized security engine (CSE)) of the isolated execution environment may establish a trust relationship with a first operating system. For example, the processor may first execute an authentication module to start an authenticated session with the first operating system. Under the authenticated session, the processor may validate a certificate received from the first operating system. If the certificate is valid, the processor may establish the trust relationship between the isolated execution environment and the first operating system.

At 406, in response to an update to certain settings of the first operating system, the processor associated with the isolated execution environment may receive the updated setting parameters. The processor may store the updated setting parameters in a profile that is marked to correspond to the first operating system.

At 408, the processor associated with the isolated execution environment may optionally establish a trust relationship with a second operating system. For example, the processor may request and check a security certificate associated with the second operating system. If the security certificate is valid, the processor may afford the second operating system a trust relation.

At 410, the processor may push the setting parameters stored in the setting profile to the second operating system and store the setting parameters in an internal register of the second operating system.

Figure 5:
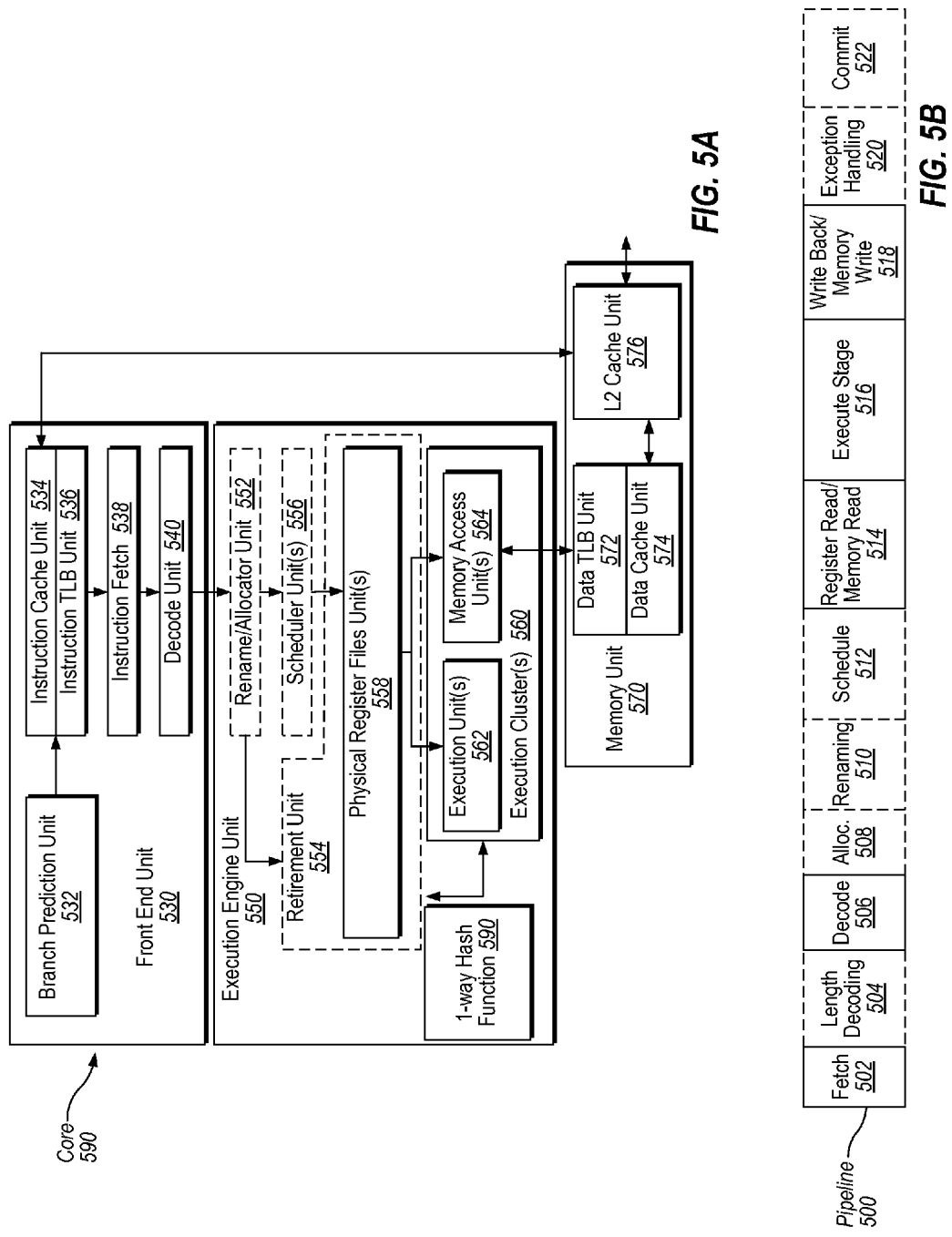
FIG. 5A is a block diagram illustrating a micro-architecture for a processor including heterogeneous core in which one embodiment of the disclosure may be used.
FIG. 5B is a block diagram illustrating an in-order pipeline and a register renaming stage, out-of-order issue/execution pipeline implemented according to at least one embodiment of the disclosure.

FIG. 5A is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc.

The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 112A described with respect to FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processing device 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
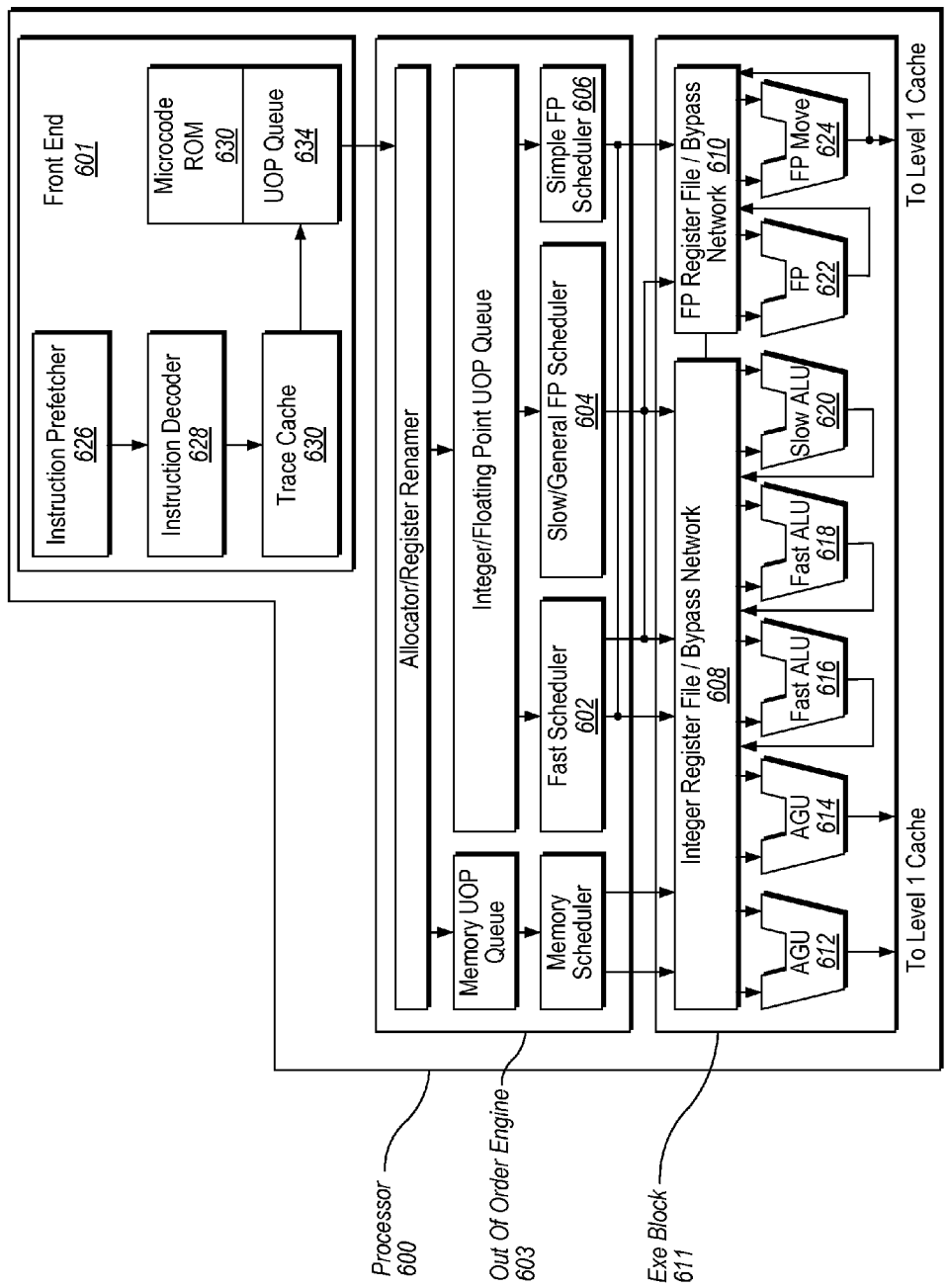
FIG. 6 illustrates a block diagram of the micro-architecture for a processor that includes logic in accordance with one embodiment of the disclosure.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
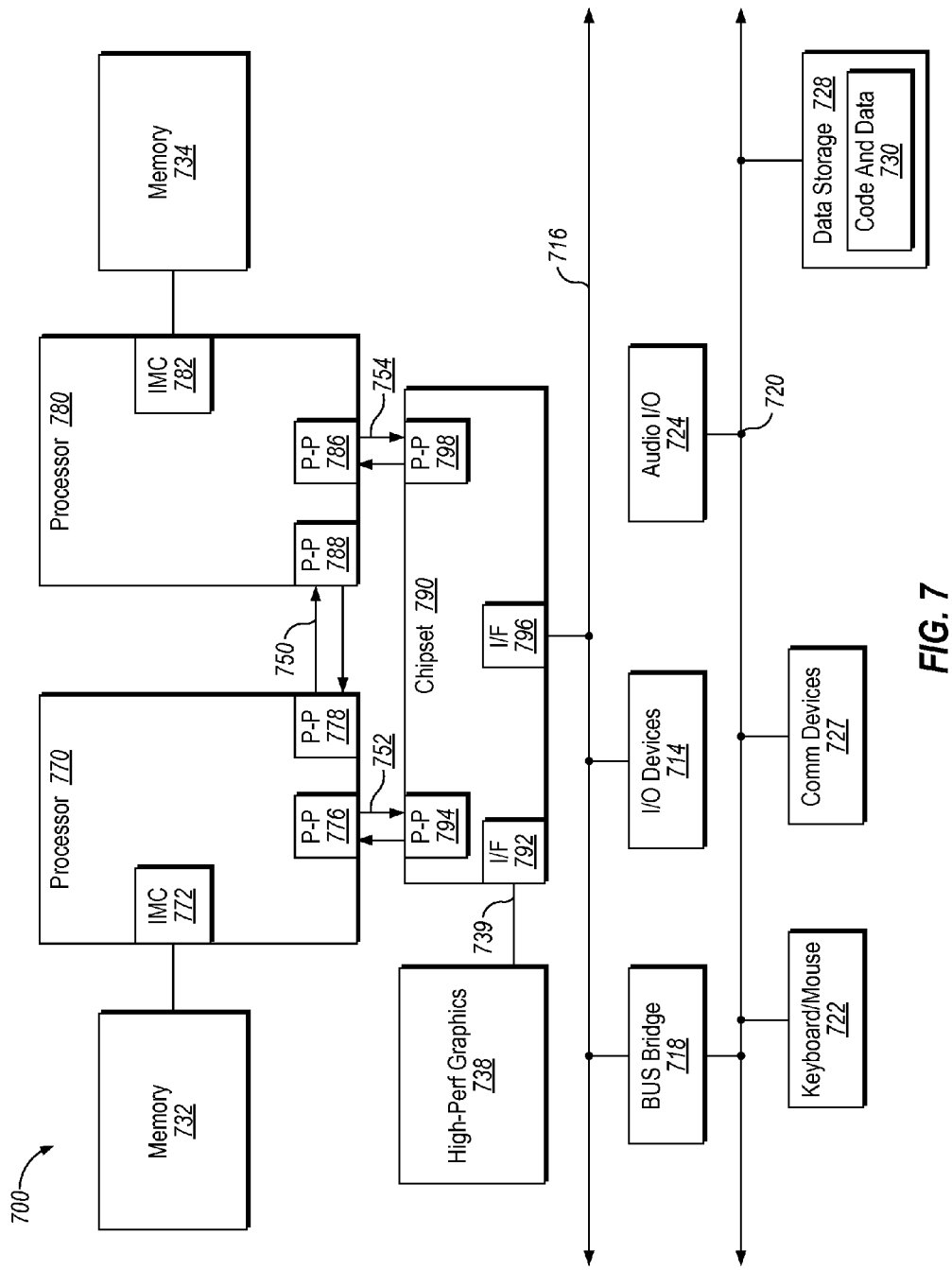
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
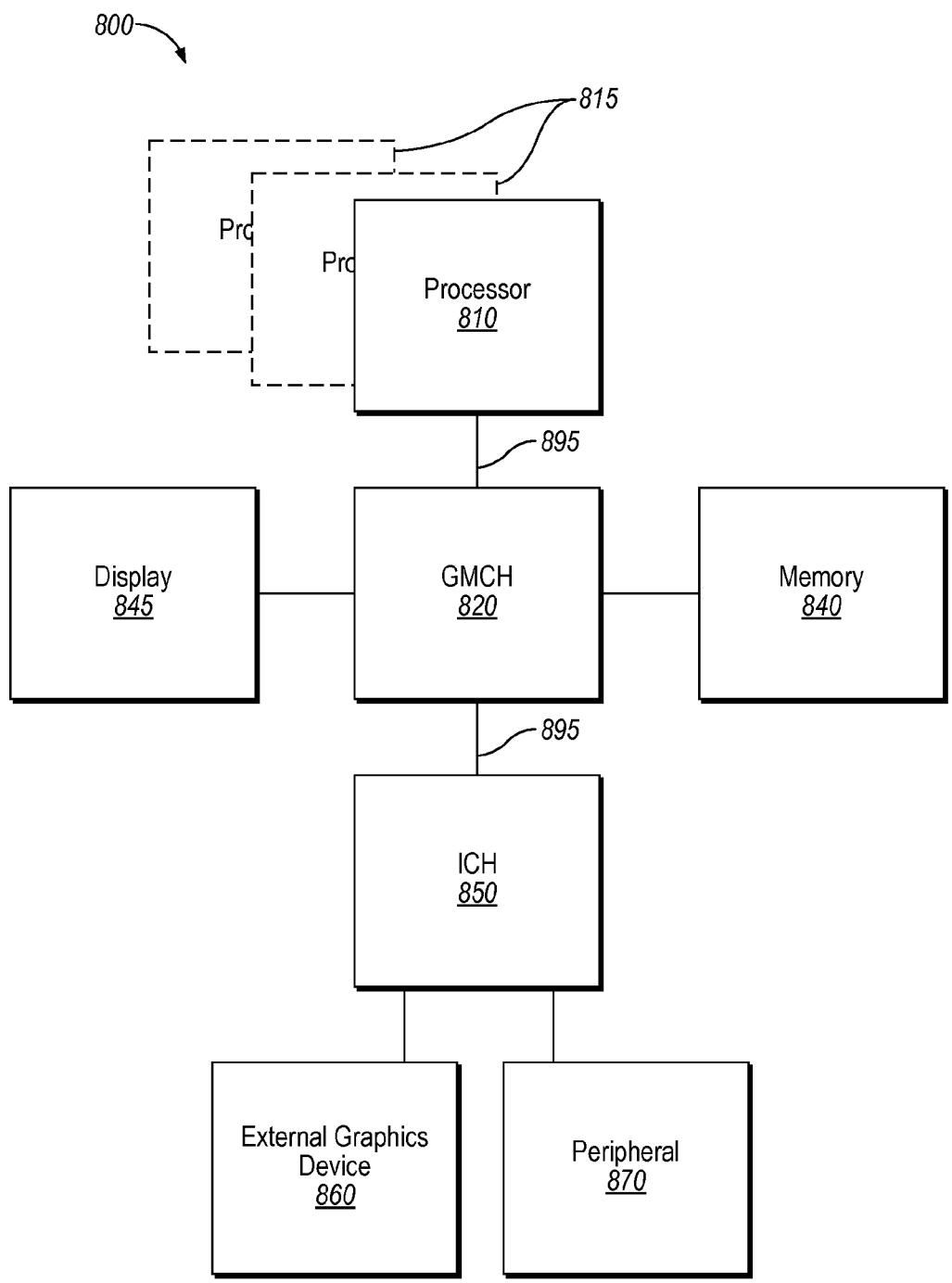
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
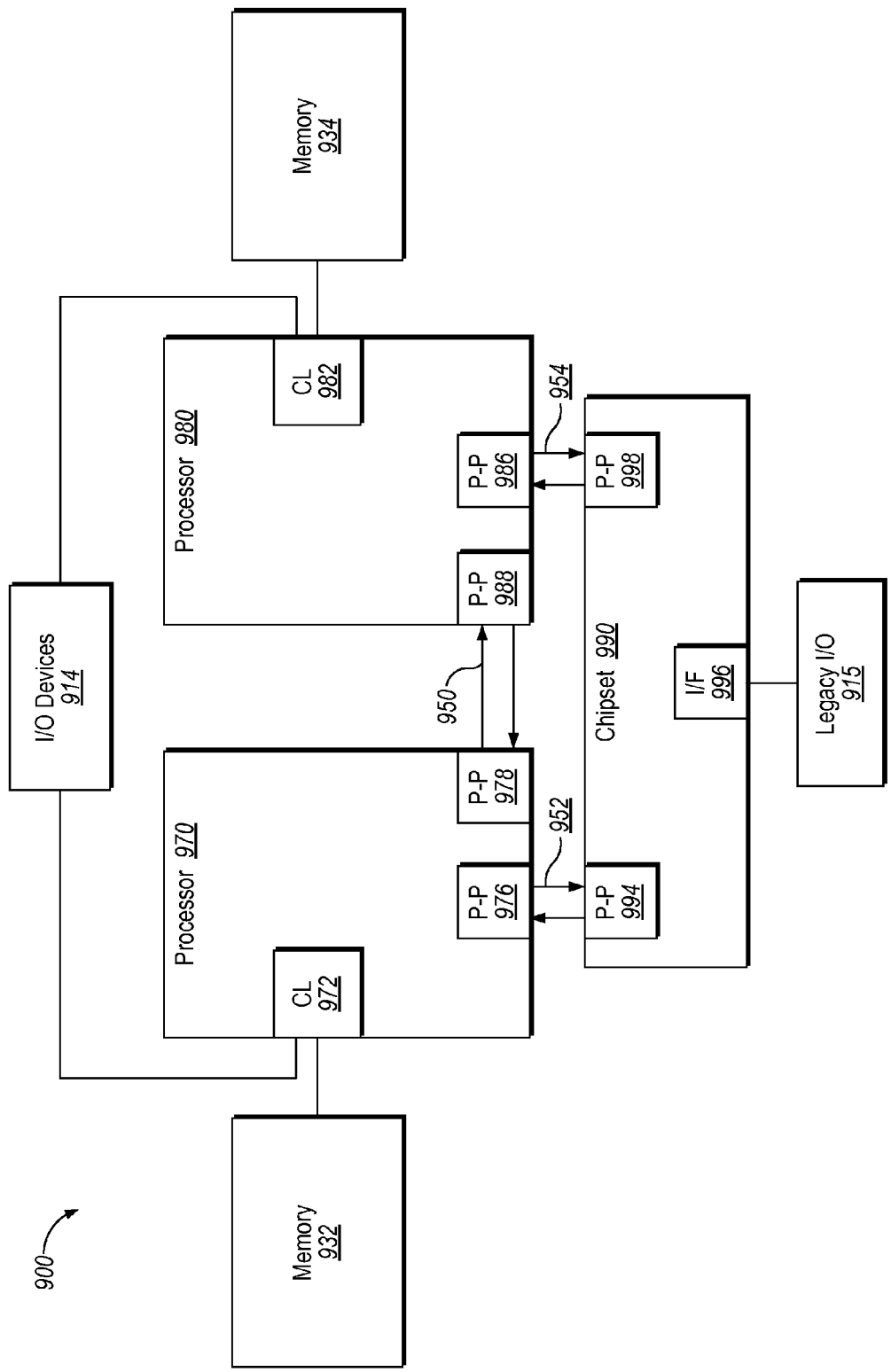
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
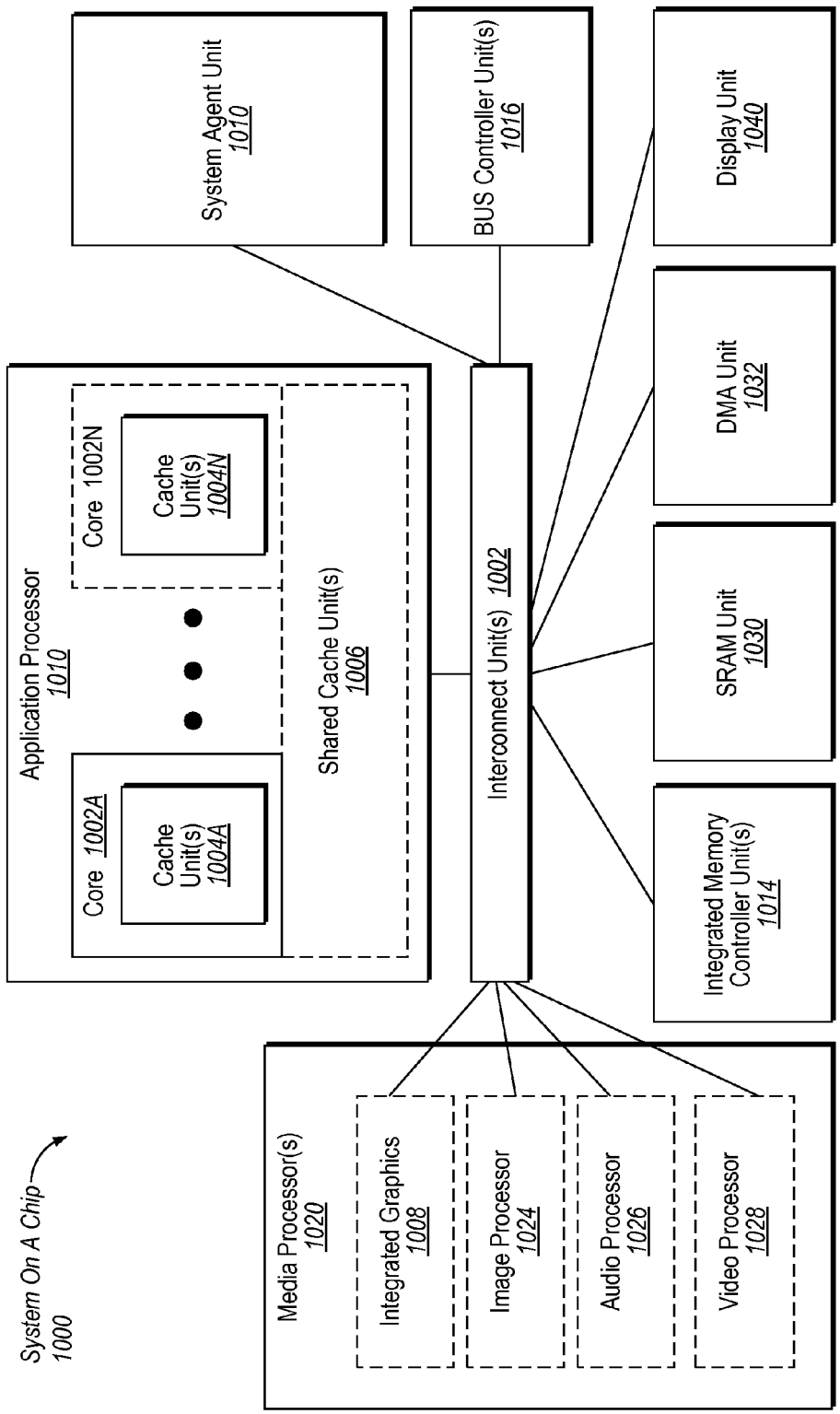
FIG. 10 is a block diagram of a System-on-a-Chip (SoC) in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
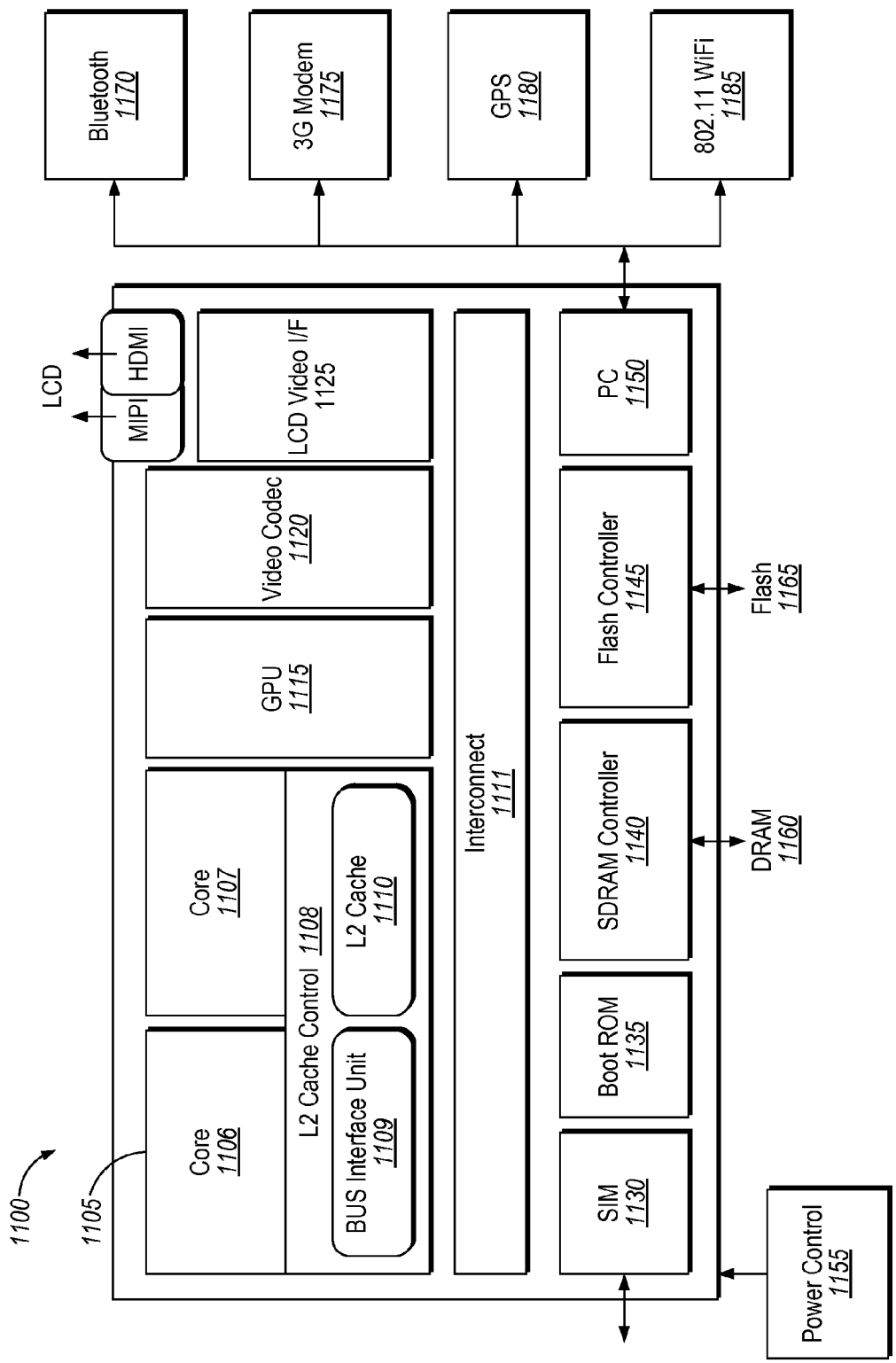
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
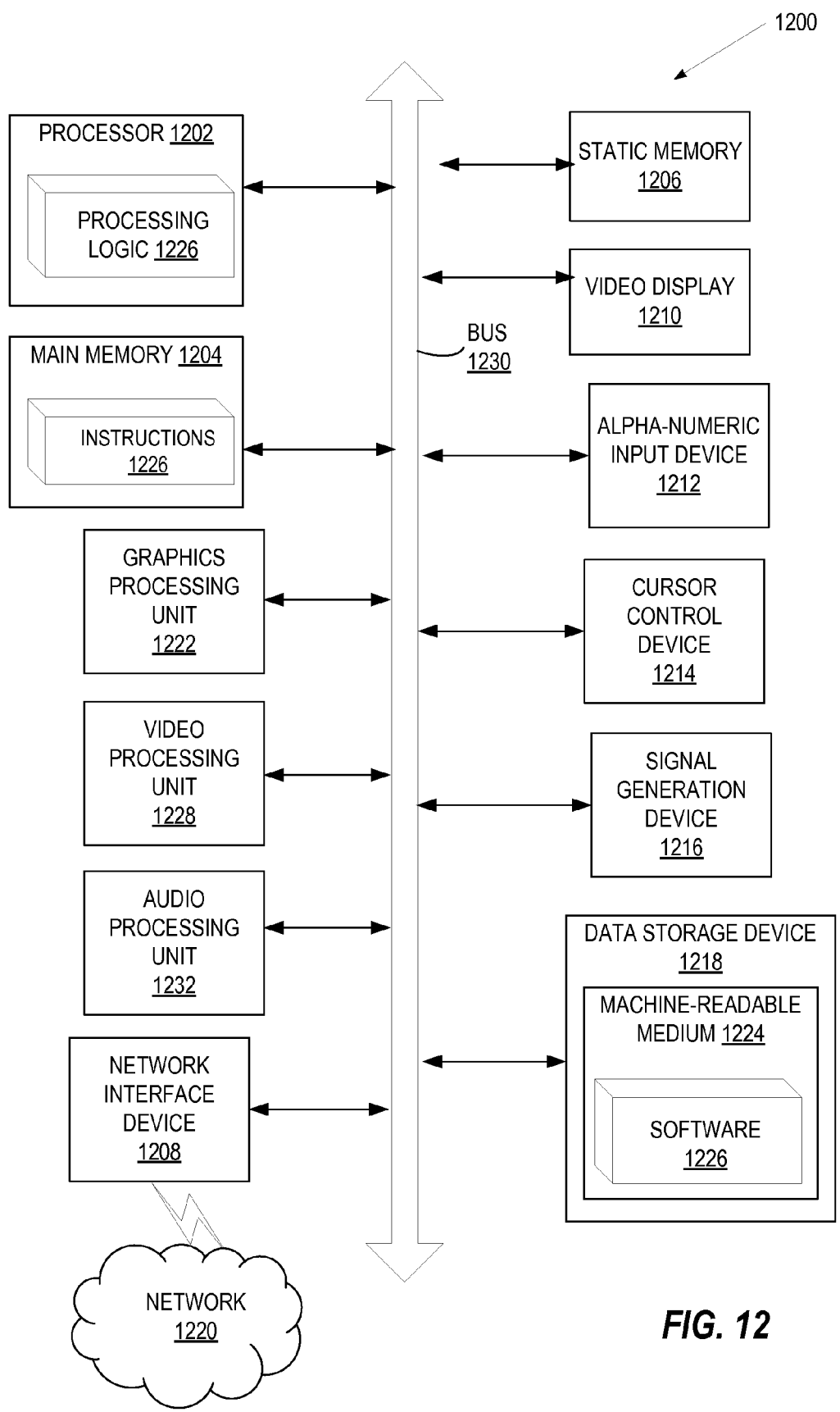
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein. In one embodiment, processing device 1202 is the same as processor architecture 100 described with respect to FIG. 1 as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processing device including a first processor executing an operating system including a configurable setting and an isolated execution environment including a second processor communicatively coupled to the first processor, and a secure store coupled to the second processor to store a setting profile containing a copy of the configurable setting, in which the second processor is to, subsequent to establishing a trust relationship between the isolated execution environment and the operating system, synchronize the configurable setting with the setting profile.

In Example 2, the subject matter of Example 1 can optionally provide that the first processor executes a second operating system that comprises a second configurable setting, and wherein the second processor is to, subsequent to establishing the trust relationship between the isolated execution environment and the second operating system, synchronize the second configurable setting with the setting profile.

In Example 3, the subject matter of Examples 1 and 2 can optionally provide that to synchronize the isolated execution environment and the second operating system, the second processor is to receive an updated configurable setting from the operating system, provide the updated configurable setting to store in the setting profile, and push the updated configurable setting stored in the setting profile to the second operating system to update the second configurable setting of the second operating system.

In Example 4, the subject matter of Example 1 can optionally provide that the second processor is coupled to the first processor via an interconnect fabric.

In Example 5, the subject matter of Example 1 can optionally provide that the second processor comprises a manageability engine coupled with the first processor.

In Example 6, the subject matter of Example 1 can optionally provide that the second processor comprises a centralized security engine coupled with the processor.

In Example 7, the subject matter of Examples 1 and 6 can optionally provide that the first processor is to register a software application with the centralized security engine, and wherein the first processor pushes an update to the setting profile to the registered software application.

In Example 8, the subject matter of Example 1 can optionally provide that the first processor hosts a plurality of virtual machines via a hypervisor, and wherein each virtual machine operates an operating system.

In Example 9, the subject matter of Examples 1 and 8 can optionally provide that the isolated execution environment comprises one of the plurality of virtual machines.

In Example 10, the subject matter of Example 8 can optionally provide that the isolated execution environment comprises the hypervisor.

In Example 11, the subject matter of Examples 1 and 2 can optionally provide that the configurable setting comprises a wireless local area network (WLAN) profile.

In Example 12, the subject matter of Examples 1 and 2 can optionally provide that the configurable setting comprises a wireless wide area network (WWAN) profile.

In Example 13, the subject matter of Examples 1 and 2 can optionally provide that the configurable setting comprises a setting for a network access certificate.

Example 14 is a System-on-a-Chip (SoC) including a first processor executing an operating system including a configurable setting, a second processor communicatively coupled to the first processor, and a secure store coupled to the second processor to store a setting profile comprising a copy of the configurable setting, in which the second processor and the secure store constitute an isolated execution environment, and wherein the second processor is to, subsequent to establishing a trust relationship between the isolated execution environment and the operating system, synchronize the configurable setting with the setting profile.

In Example 15, the subject matter of Example 14 can optionally provide that the first processor executes a second operating system that comprises a second configurable setting, and wherein the second processor is to, subsequent to establishing the trust relationship between the isolated execution environment and the second operating system, synchronize the second configurable setting with the setting profile.

In Example 16, the subject matter of any of Examples 14 and 15 can optionally provide that to synchronize the isolated execution environment and the second operating system, the second processor is to receive an updated configurable setting from the operating system, provide the updated configurable setting to store in the setting profile, and push the updated configurable setting stored in the setting profile to the second operating system to update the second configurable setting of the second operating system.

In Example 17, the subject matter of Example 14 can optionally provide that the second processor comprises a manageability engine coupled with the first processor.

In Example 18, the subject matter of any of Examples 14 and 17 can optionally provide that the second processor comprises a centralized security engine coupled with the processor.

In Example 19, the subject matter of Example 18 can optionally provide that the first processor is to register a software application with the centralized security engine, and wherein the first processor pushes an update to the setting profile to the registered software application.

Example 20 is a method including establishing, by a second processor of an isolated execution environment, a trust relationship between the isolated execution environment and a first operating system executed on a first processor, synchronizing a setting profile stored in a secure store associated with the isolated execution environment and a configurable setting of the first operating system, establishing a trust relationship between the isolated execution environment and a second operating system executed on the first processor, and synchronizing the setting profile stored in the secure store associated with the isolated execution environment and a second configurable setting of the second operating system.

In Example 21, the subject matter of Example 20 can further include responsive to receiving an update to the configurable setting of the first operating system, storing the update in the setting profile, and pushing the update to the second operating system to update the second configurable setting.

In Example 22, the subject matter of any of Examples 20 and 21 can optionally provide that the second processor comprises a manageability engine coupled with the first processor.

In Example 23, the subject matter of Example 22 can optionally provide that the second processor comprises a centralized security engine coupled with the processor.

Example 24 is an apparatus including means for performing the method of any one of claims 20 and 21.

Example 25 is a machine-readable non-transitory medium having stored thereon program codes that, when executed, perform operations, the operations including establishing, by a second processor of an isolated execution environment, a trust relationship between the isolated execution environment and a first operating system executed on a first processor, synchronizing a setting profile stored in a secure store associated with the isolated execution environment and a configurable setting of the first operating system, establishing a trust relationship between the isolated execution environment and a second operating system executed on the first processor, and synchronizing the setting profile stored in the secure store associated with the isolated execution environment and a second configurable setting of the second operating system.

In Example 26, the subject matter of Example 25 can further include responsive to receiving an update to the configurable setting of the first operating system, storing the update in the setting profile, and pushing the update to the second operating system to update the second configurable setting.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising:
    a first processor executing a first operating system comprising a first setting, wherein the first processor is to:
        execute a plurality of virtual machines using a hypervisor, wherein each one of the plurality of virtual machines comprises a respective guest operating system;
        register, with a centralized security engine, a software application executing on one of the plurality of virtual machines; and
        forward a setting profile to the registered software application; and
    an isolated execution environment comprising:
        a second processor, communicatively coupled to the first processor, to execute an additional virtual machine as the centralized security engine; and
        a secure store coupled to the second processor to store the setting profile containing a copy of the first setting, wherein the second processor is to, subsequent to establishing a trust relationship between the isolated execution environment and the first operating system, forward an updated first setting from the setting profile to the first processor to synchronize the first setting with the setting profile.

2. The processing device of claim 1, wherein the first processor executes a second operating system that comprises a second setting, and wherein the second processor is to, subsequent to establishing the trust relationship between the isolated execution environment and the second operating system, synchronize the second setting with the setting profile.

3. The processing device of claim 2, wherein to synchronize the isolated execution environment and the second operating system, the second processor is to:
    receive the updated first setting from the first operating system,
    provide the updated first setting to store in the setting profile, and
    forward the updated first setting stored in the setting profile to the second operating system to update the second setting of the second operating system.

4. The processing device of claim 1, wherein the second processor is coupled to the first processor via an interconnect fabric.

5. The processing device of claim 1, wherein the second processor comprises a manageability engine coupled with the first processor.

6. The processing device of claim 1 wherein the isolated execution environment comprises the hypervisor.

7. The processing device of claim 1, wherein the first setting comprises a wireless local area network (WLAN) profile.

8. The processing device of claim 1, wherein the first setting comprises a wireless wide area network (WWAN) profile.

9. The processing device of claim 1, wherein the first setting comprises a setting for a network access certificate.

10. A System-on-a-Chip (SoC) comprising:
    a first processor executing a first operating system comprising a first setting, wherein the first processor is to:
        execute a plurality of virtual machines using a hypervisor, wherein each one of the plurality of virtual machines comprises a respective guest operating system;

register, with a centralized security engine, a software application executing on one of the plurality of virtual machines; and forward a setting profile to the registered software application;

a second processor, communicatively coupled to the first processor, to execute an additional virtual machine as the centralized security engine; and a secure store coupled to the second processor to store the setting profile comprising a copy of the first setting, wherein the second processor and the secure store constitute an isolated execution environment, and wherein the second processor is to, subsequent to establishing a trust relationship between the isolated execution environment and the first operating system, forward an updated first setting from the setting profile to the first processor to synchronize the first setting with the setting profile.

11. The SoC of claim 10, wherein the first processor executes a second operating system that comprises a second setting, and wherein the second processor is to, subsequent to establishing the trust relationship between the isolated execution environment and the second operating system, synchronize the second setting with the setting profile.

12. The SoC of claim 11, wherein to synchronize the isolated execution environment and the second operating system, the second processor is to:

receive the updated first setting from the first operating system;

provide the updated first setting to store in the setting profile, and forward the updated first setting stored in the setting profile to the second operating system to update the second setting of the second operating system.

13. The SoC of claim 10, wherein the second processor comprises a manageability engine coupled with the first processor.

14. A method comprising:

establishing, by a second processor of an isolated execution environment, a trust relationship between the isolated execution environment and a first operating system executed on a first processor, wherein the first processor is to:

execute a plurality of virtual machines using a hypervisor, wherein each one of the plurality of virtual machines comprises a respective guest operating system;

register, with a centralized security engine, a software application executing on one of the plurality of virtual machines, wherein the second processor executes an additional virtual machine as the centralized security engine; and forward a setting profile to the registered software application;

forwarding an updated first setting stored in a setting profile to the first processor to synchronize the setting profile stored in a secure store associated with the isolated execution environment and the first setting of the first operating system;

establishing a trust relationship between the isolated execution environment and a second operating system executed on the first processor;

forwarding an updated second setting from the setting profile to the first processor to synchronize the setting profile stored in the secure store associated with the isolated execution environment and a second setting of the second operating system.

15. The method of claim 14, further comprising:

responsive to receiving an update to the first setting of the first operating system;

storing the update in the setting profile; and forwarding the update to the second operating system to update the second setting.

16. The method of claim 15, wherein the second processor comprises a manageability engine coupled with the first processor.

* * * * *